United States Patent
Ranta-Aho et al.

(10) Patent No.: US 8,155,060 B2
(45) Date of Patent: Apr. 10, 2012

(54) RECOVERY METHOD FOR LOST SIGNALING CONNECTION WITH HSDPA/FRACTIONAL DPCH

(75) Inventors: Karri Ranta-Aho, Espoo (FI); Antti Toskala, Espoo (FI)

(73) Assignee: Nokia Corporation, Espoo (FI)

( * ) Notice: Subject to any disclaimer, the term of this patent is extended or adjusted under 35 U.S.C. 154(b) by 470 days.

(21) Appl. No.: 11/157,486

(22) Filed: Jun. 20, 2005

(65) Prior Publication Data

US 2005/0281222 A1    Dec. 22, 2005

Related U.S. Application Data

(60) Provisional application No. 60/581,672, filed on Jun. 21, 2004.

(51) Int. Cl.
*H04W 4/00* (2009.01)

(52) U.S. Cl. ........ 370/329; 370/310; 370/332; 370/331; 455/445; 455/436; 455/437; 455/438; 455/439; 455/440; 455/441; 455/442; 455/443; 455/444

(58) Field of Classification Search .......... 455/436–445; 370/310–350
See application file for complete search history.

(56) References Cited

U.S. PATENT DOCUMENTS

| | | | |
|---|---|---|---|
| 6,747,963 B1 | 6/2004 | Park et al. | |
| 7,089,029 B2* | 8/2006 | Cao et al. | 455/522 |
| 7,324,480 B2* | 1/2008 | Kim et al. | 370/334 |
| 2002/0141331 A1 | 10/2002 | Mate et al. | |
| 2002/0160781 A1* | 10/2002 | Bark et al. | 455/450 |
| 2003/0185242 A1* | 10/2003 | Lee et al. | 370/491 |
| 2003/0189909 A1 | 10/2003 | Chao et al. | |
| 2003/0232622 A1 | 12/2003 | Seo et al. | |
| 2004/0052229 A1 | 3/2004 | Terry et al. | |
| 2004/0085926 A1 | 5/2004 | Hwang et al. | |
| 2005/0009527 A1* | 1/2005 | Sharma | 455/445 |
| 2005/0068963 A1 | 3/2005 | Lee et al. | |
| 2007/0081492 A1* | 4/2007 | Petrovic et al. | 370/331 |

FOREIGN PATENT DOCUMENTS

EP    1341318 A2    9/2003

(Continued)

OTHER PUBLICATIONS

12 Pages, Korean Non-Final Office Action with translation dated Mar. 4, 2009.

(Continued)

*Primary Examiner* — Dwayne Bost
*Assistant Examiner* — Amancio Gonzalez

(57) ABSTRACT

A method and apparatus are provided for defining terminal behavior in a case where the terminal detects that it cannot receive the HS-DSCH from a serving cell reliably when the DCCH is mapped to HS-DSCH (e.g. does not receive any radio link control (RLC) acknowledged mode feedback for the uplink measurement reports or in general the common pilot channel (CPICH) level drops too low in the serving HS-DSCH cell). The terminal is autonomously moved to a cell forward access channel (CELL_FACH) state and uplink signaling is initiated on a random access channel (RACH) to inform a network node and ask for HS-DSCH re-establishment in a suitable cell (preferably in the one being strongest one in the active set or according to the measurements done prior the connection from the serving HS-DSCH cell was lost), or setting up a regular R'99/R'5 DPCH in order to restore the RRC signaling connection in the CELL_DCH state.

97 Claims, 4 Drawing Sheets

Proposed Fractional DPCH slot formats [TR25.899]

FOREIGN PATENT DOCUMENTS

| | | |
|---|---|---|
| EP | 1519519 A1 | 3/2005 |
| KR | 20000071672 | 11/2000 |
| WO | 02067606 | 8/2002 |
| WO | 03087978 | 10/2003 |
| WO | WO 2004/102824 A1 | 11/2004 |
| WO | 2005029785 | 3/2005 |
| WO | WO 2005/029785 A1 | 3/2005 |
| WO | WO 2006/000876 | 1/2006 |

OTHER PUBLICATIONS

3GPP TS 25.331 V3. 11.0 (Jun. 2002) URL: http://www.arib.or.jp/IMT-2000/V310Sep02/S3g/R99/25/25331-3b0.pdf. 3rd Generation Partnership Project; Technical Specification Group Radio Access Network; Radio Resource Control (RRC); Protocol Specification (Release 1999).

3 Pages English Language Translation of Russian Office Action for application 2006145199/09 (049348).

4 Pages Russian Office Action for application 2006145199/09 (049348).

"3rd Generation partnership Project; Technical Specification Group Radio Access Network; Radio Resource Control (RRC); Protocol Specification", Jun. 2002, pp. 37-38.

English language translation of Japanese Office Action issued Jun. 24, 2010 in Japanese patent application No. 2007-516068 (6 pages).

1 Page English Language Abstract KR2000-0071672.

5 Pages Korean Office Action for application 10-2009-7001682 with translation.

Cover page, p. 37 and p. 38 (labeled collectively 3-1, 3-2 and 3-3) from 3GPP TS 25.331 V3. 11.0 (Jun. 2002) URL: http://www.arib.or.jp/IMT-2000/V310Sep02/S3g/R99/25/25331-3b0.pdf. 3rd Generation Partnership Project; Technical Specification Group Radio Access Network; Radio Resource Control (RRC); Protocol Specification (Release 1999) Chapter 7.2.2.2. Kindly note that the Korean Patent Office only cited the cover page and pp. 37-38 of the 3GPP TS 25.331 V3. 11.0 (Jun. 2002) document, which is over 833 pages. The document was filed in its entirety on May 7, 2010 in U.S. Appl. No. 12/697,801 and on May 13, 2009 in U.S. Appl. No. 11/157,486.

1 Page English Language Abstract KR2000-0071672, Nov. 25, 2000.

5 Pages Korean Office Action for application 10-2009-7001682 with translation, dated Sep. 9, 2010.

3 Pages English Language Translation of Russian Office Action for application 2006145199/09 (049348), dated Jul. 13, 2009.

4 Pages Russian Office Action for application 2006145199/09 (049348), dated Jul. 13, 2009.

* cited by examiner

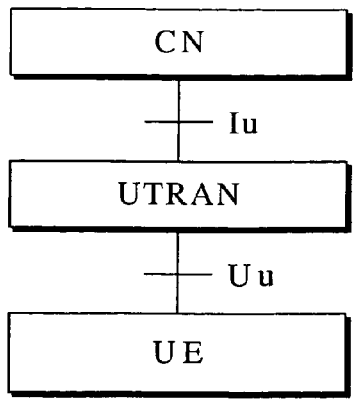
Figure 1a : The Basic 3GPP Network
(Prior Art)
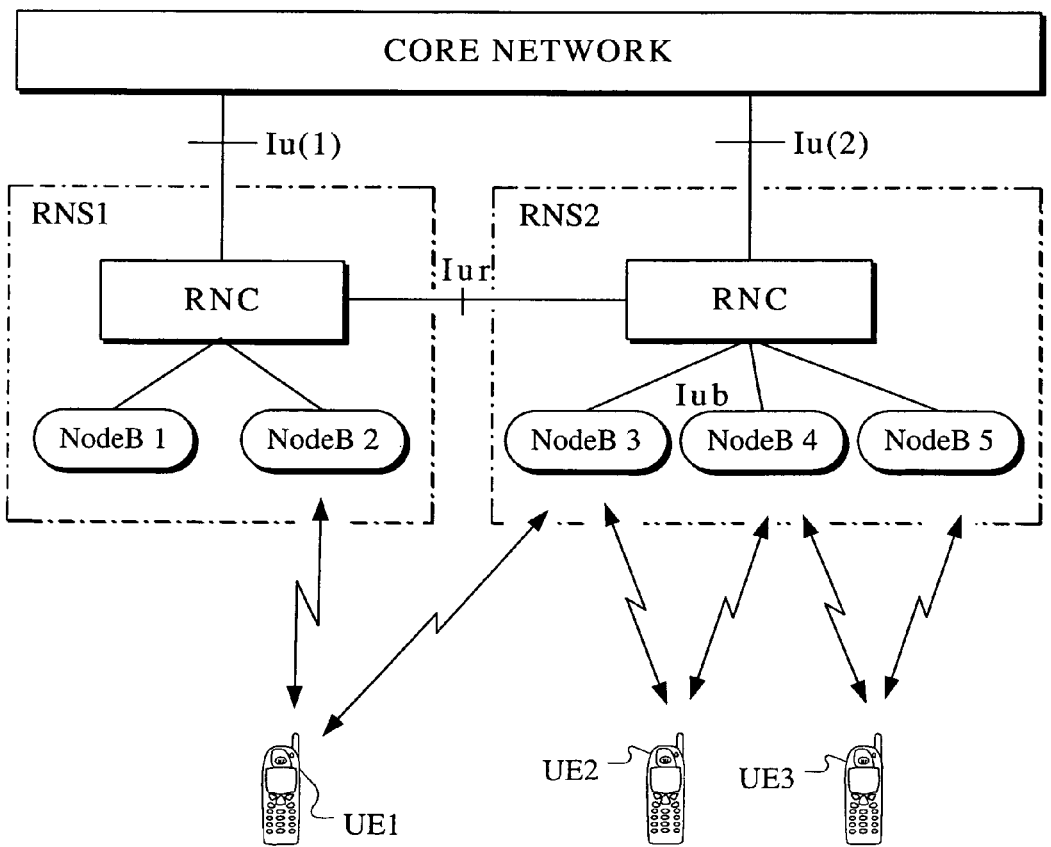
Figure 1b : The 3GPP Network in More Detail
(Prior Art)

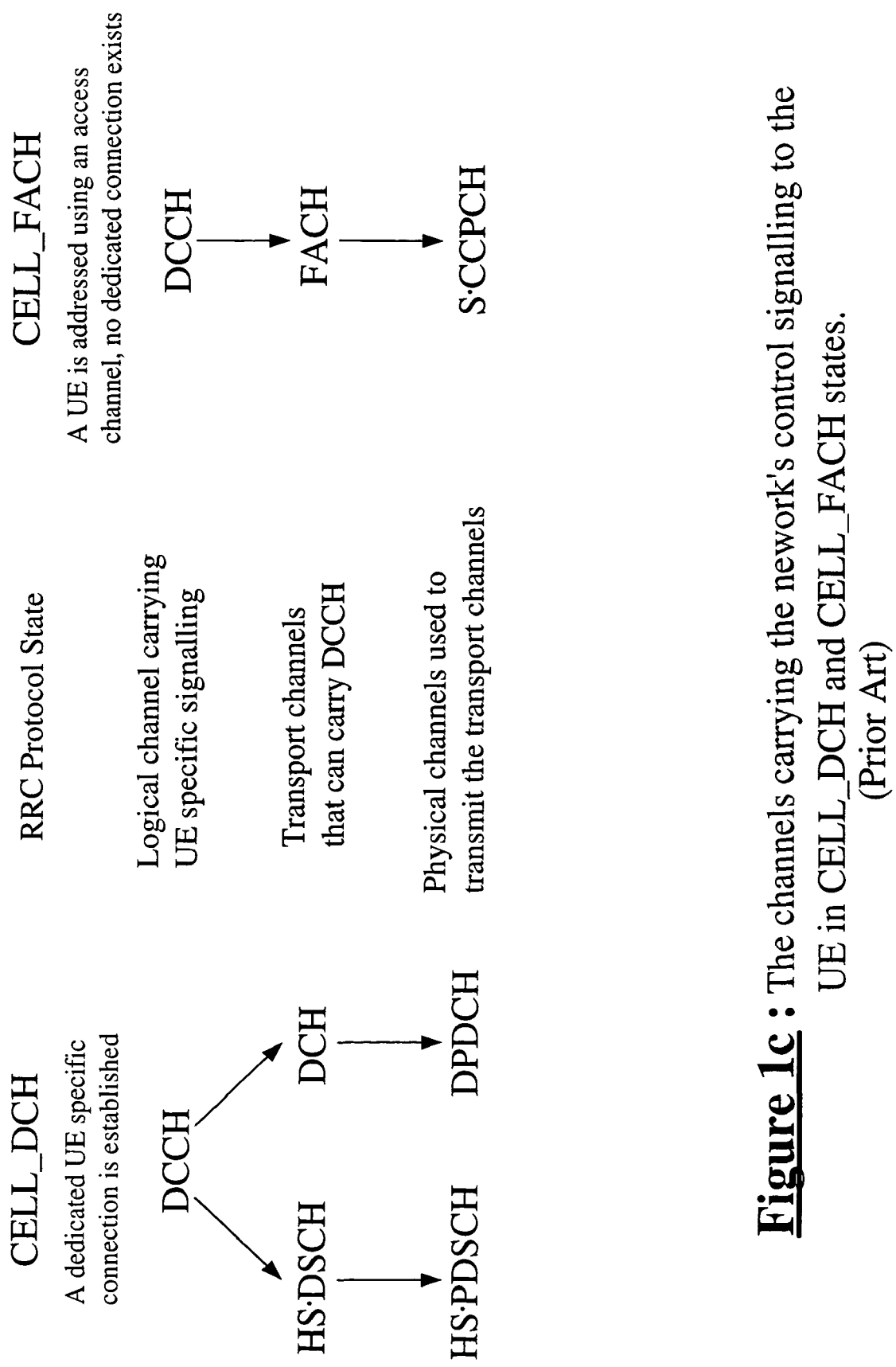
Figure 1c : The channels carrying the nework's control signalling to the UE in CELL_DCH and CELL_FACH states.
(Prior Art)

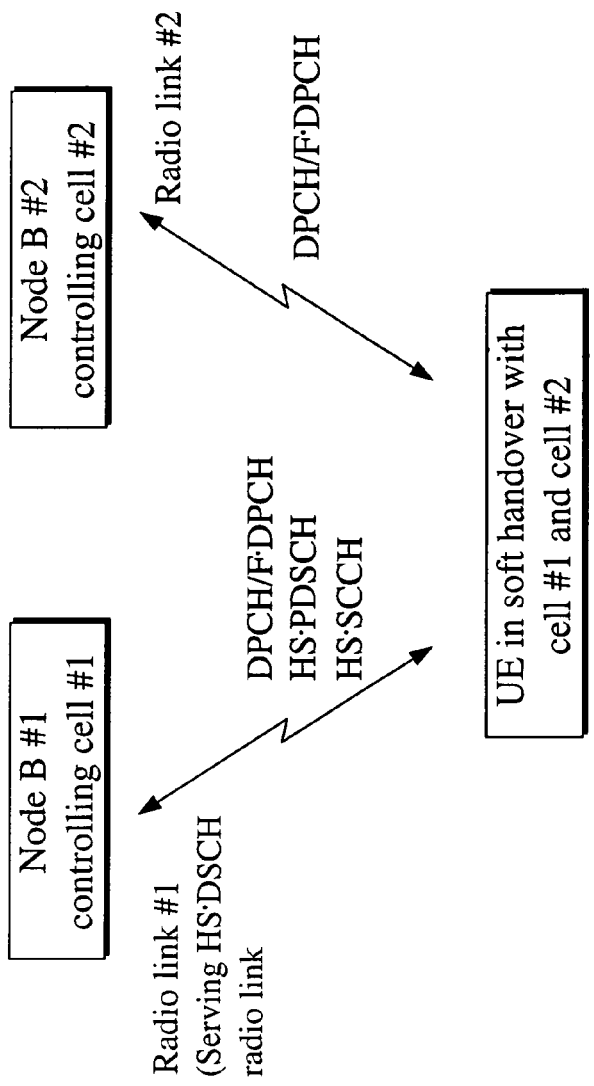

- DPCH or F·DPCH is transmitted by all the radio links (same in all RLs). Provides at minimum power control information
- HS·PDSCH is transmitted by the serving HS·DSCH radio link only, carries HS·DSCH
- HS·SCCH is transmitted by the serving HS·DSCH radio link only, used to deliver HS·PDSCH related control information

Figure 1d: HS·DSCH and SHO. Physical layer connection is to all the cells participating to the SHO. HS·DSCH is delivered from one cell only
(Prior Art)

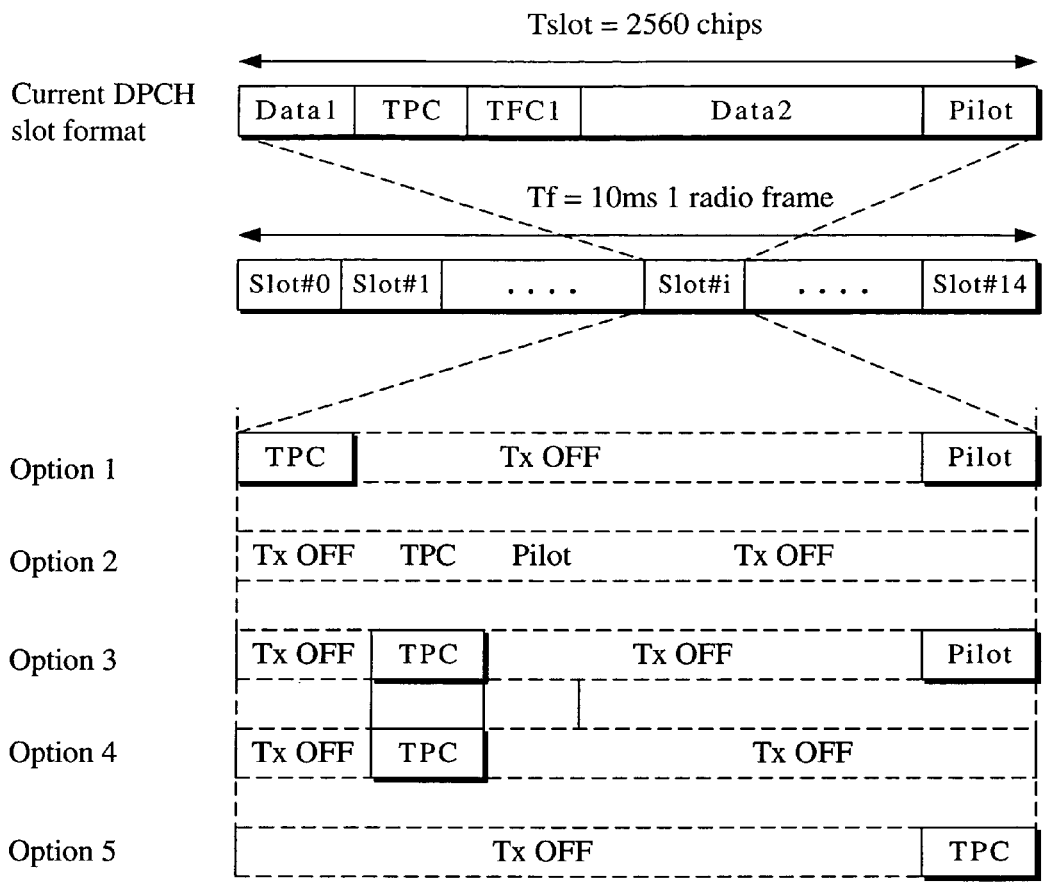
Figure 2: Proposed Fractional DPCH slot formats [TR25.899]
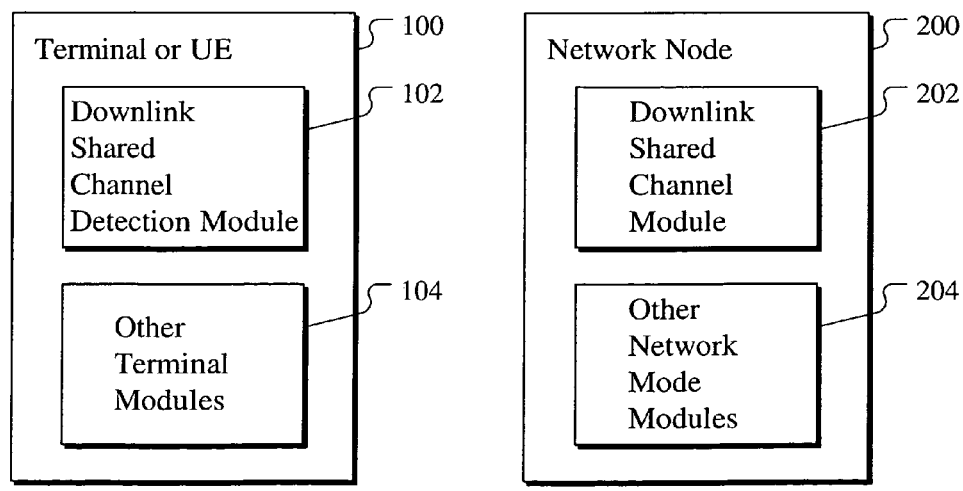
Figure 3: Terminal    Figure 4: Network Node

RECOVERY METHOD FOR LOST SIGNALING CONNECTION WITH HSDPA/FRACTIONAL DPCH

CROSS-REFERENCE TO RELATED APPLICATIONS

This application claims benefit to provisional patent application No. 60/581,672, filed Jun. 21, 2004, entitled "Recovery Method for Lost Signalling Connection with HSPDA/Fractional DPCH," which is hereby incorprated by reference in its entirety.

BACKGROUND OF THE INVENTION

1. Technical Field

The present invention generally relates to a universal mobile telecommunications system (UTMS), including the UTMS that forms part of the 3rd generation partnership project (3GPP or 3GPP2) based on code division multiple access (CDMA).

The present invention relates to the Release 6 wideband CDMA (also known as "WCDMA") specification that includes high speed downlink packet access (HSDPA) and a new feature, a so-called "Fractional Dedicated Physical Channel (F-DPCH)," to be used together with HSDPA; and more particularly, relates to a recovery method for a lost signaling connection with HSDPA/Fractional DPCH.

2. Description of Related Problem

In general, FIGS. 1a and 1b show basic diagrams of the UMTS packet network architecture, which is known in the art. In FIG. 1a, the UMTS packet network architecture includes the major architectural elements of user equipment (UE), UMTS Terrestrial Radio Access Network (UTRAN), and core network (CN). The UE (also referred to as a "terminal" herein) is interfaced to the UTRAN over a radio (Uu) interface, while the UTRAN interfaces to the core network (CN) over a (wired) Iu interface. FIG. 1b shows some further details of the architecture, particularly the UTRAN, which includes multiple Radio Network Subsystems (RNSs), each of which contains at least one Radio Network Controller (RNC). In operation, each RNC may be connected to multiple Node Bs which are the UMTS counterparts to GSM base stations. Each Node B may be in radio contact with multiple UEs via the radio interface (Uu) shown in FIG. 1b. A given UE may be in radio contact with multiple Node Bs even if one or more of the Node Bs are connected to different RNCs. For instance, a UE1 in FIG. 1b may be in radio contact with Node B2 of RNS1 and Node B3 of RNS2 where Node B2 and Node B3 are neighboring Node Bs. This may occur, for example, when the UE1 is in a handover situation and there is a change in the connection from one Node B to another. The RNCs of different RNSs may be connected by an Iur interface which allows mobile UEs to stay in contact with both RNCs while traversing from a cell belonging to a Node B of one RNC to a cell belonging to a Node B of another RNC.

The Release 6 WCDMA specifications provide for the use of the "Fractional Dedicated Physical Channel (F-DPCH)" together with HSDPA, which may be implemented in a UMTS such as that shown in FIGS. 1a and 1b. In particular, FIG. 2 shows the proposed Fractional DPCH slot formats in the downlink (DL), and illustrates the fact that there is no space in the DL dedicated physical channel (DPCH) for any data carrying dedicated physical data channel (DPDCH) bits. For example, the current DPCH radio frame includes 15 slots, each slot #i having a DPDCH (Data1), DPCCH (TPC and TFCI), DPDCH (Data2) and DPCCH (Pilot), while the proposed Fractional DPCH slot formats include five different options 1-5 (Option 4 was adopted to the specifications), each having some arrangement of the TPC and Pilot in relation to Tx OFF, where the transmission is off, as shown, but no DPDCH bits.

In effect, the principle of the Fractional DPCH is to have in the downlink direction only a Dedicated Physical Control Channel (DPCCH) and not a Dedicated Physical Data Channel (DPDCH) at all, and thus all traffic in the downlink, including a logical channel carrying the control signaling, Dedicated Control Channel (DCCH) (radio resource control (RRC) signaling etc.), would be carried on HSDPA (e.g., on HS-DSCH).

The problem with this approach is that at the cell edge in the soft handover area the terminal may be receiving several radio links but the HS-DSCH only from a single base transceiving station (BTS) (as HS-DSCH cannot be in soft handover). In the Release 5 specifications, if the measurements indicate that the serving cell with the HS-DSCH has become weak, then the control-signaling-carrying logical channel, DCCH, [KRa1]transmitted on the downlink DPCH (DPCH being formed by DPCCH and DPDCH and thus having a data carrying capability) can be used to transport the control message reconfiguring the HS-DSCH to be coming from another cell. This is because when the UE is in SHO the same DPDCH content is transmitted from all the cells participating in the soft handover, but the HS-DSCH is transmitted only from one cell, and thus losing the signal from one cell does not impact the reception of the channels transmitted on the downlink DPDCH. (See FIG. 1d below.) Now if the DCCH delivering the control signaling is mapped on the HS-DSCH and this cell transmitting the HS-DSCH becomes too weak for reliable signaling (and is lost from an active set of suitable cells in the worst case), then a situation can develop in which there is a DPCH coming from several cells but no possibility to carry signaling in the downlink for the terminal, and thus there is no mechanism for the network to reconfigure the terminal's reception to somewhere else from the HS-DSCH that was lost. The situation can occur even with the Release 5 specifications (e.g. if the DCCH is mapped to the HS-DSCH), although the problem can be avoided simply by mapping the DCCH always on the DPCH (and never on the HS-DSCH). However, with the Fractional DPCH, there are no other options available than to use the HS-DSCH for signaling thus the problem cannot be circumvented.

For example, FIG. 1c shows in particular how the DCCH can be mapped either to HSDPA or DCH channels when in the CELL_DCH state and in parallel showing how DCCH is mapped when in the CELL_FACH state, while FIG. 1d shows that HS-DSCH is always transmitted from one cell only. In operation, if the DCCH is transmitted with DPCH, then in the SHO it is transmitted using all the radio links and thus losing one radio link does not cut the DCCH connection, but when DCCH is transmitted with HS-DSCH then in the SHO if that radio link (RL) is lost then the DCCH connection is lost and can be recovered by moving to CELL-FACH where the DCCH is sent using forward access channel shared by all UEs in the CELL_FACH state.

There is no known prior art that provides a solution to this problem.

SUMMARY OF THE INVENTION

The present invention provides a solution to this problem.

In its broadest sense, the present invention provides a new and unique method featuring steps of detecting in one node, such as a terminal, that a downlink shared channel cannot be received reliably from another node, such as a Node B in control of a serving cell, in a network when a control channel is mapped to the shared channel and autonomously moving the terminal to another protocol state. The method also includes an automatic re-establishment of a signaling carrying connection between the terminal and the network without actions needed from the user of the terminal.

In one embodiment, the downlink shared channel may be a high speed downlink shared channel (HS-DSCH), the control channel may be a dedicated control channel (DCCH), and the DCCH may be carried over the HS-DSCH, the control protocol may be radio resource control (RRC) protocol and the protocol states may be RRC protocol states, such as e.g. CELL_FACH and CELL_DCH, or some combination of one or more of these features.

In operation, after the terminal detects that the downlink shared channel is lost, it may notify the network of the same. The terminal also initiates uplink signaling on an access channel to inform a network node and ask for downlink shared channel re-establishment in a suitable cell. In one embodiment, the access channel may take the form of the random access channel (RACH) or other suitable access channel. The suitable cell may be the strongest cell in an active set of cells, and may be based on measurements done prior to when the connection from the serving cell was lost.

In an alternative embodiment, the network itself may initiate procedures for re-establishing the radio link and, if applicable, re-establishing the downlink shared channel connection.

In accordance with the present invention, the step of detecting may include estimating the quality criterion based on information in the control channel received from the serving cell, including information in one or more TPC fields. The terminal detects that the shared channel connection is lost when the quality of the control channel transmitted in the same radio link with the shared channel is worse than a predetermined threshold quality ($Q_{out}$) over a predetermined period. By way of example, the predetermined threshold quality ($Q_{out}$) may correspond to about a 30% error probability of the TPC fields in the control channel, or some other suitable quality criterion, and [KRa2]the predetermined time period is about 160 milliseconds, a multiple of 160 milliseconds, or some other suitable timeframe. [KRa3]When the terminal is in a given state where a dedicated physical channel is allocated to the terminal in uplink and downlink directions, then after considering the quality criterion over a predetermined period, the terminal considers the link quality to be either "in sync" or "out of sync". After considering the quality criterion over one or several consecutive periods to be "out of sync" in relation to established physical channels, the terminal starts a timer; and upon considering the quality criterion over one or multiple successive periods to be "in sync" the terminal stops and resets the timer, or if the timer expires then determines that there is a radio link failure. The established physical channels may include physical channels (DPCCH or F-DPCH). The radio link failure triggers the UE to initiate a cell update procedure, during which the dedicated physical channels are released and the terminal moves to the CELL_FACH state.

In particular, the method also uniquely features a step of setting up a regular R'99/R'5 DPCH in order to restore the radio resource control (RRC) signaling connection in a CELL_DCH state.

The present invention may be implemented in apparatus that may take the form of either user equipment or terminal, a network node, a network or system, a computer program product or some combination thereof.

For example, the user equipment or terminal may feature a module that detects that the downlink shared channel cannot be received reliably from the serving cell in the network when the control channel is mapped to the shared channel and autonomously moves the user equipment to another protocol state, in accordance with the present invention and consistent with that described herein.

The network node may feature a corresponding module for cooperating with such user equipment (or terminal) in such a network, wherein the corresponding module allows the terminal to detect that such a downlink shared channel cannot be received reliably from such a serving cell in such a network when such a control channel is mapped to such a shared channel and to move autonomously to such another protocol state, in accordance with the present invention and consistent with that described herein.

The network or system would have such a network node for cooperating with such a terminal.

The present invention may also take the form of a computer program product with a program code, which program code is stored on a machine readable carrier, for carrying out the steps of a method including: detecting in a terminal or UE or network node that a downlink shared channel cannot be received reliably from a serving cell in a network when a control channel is mapped to the shared channel and autonomously moving the terminal to another protocol state, when the computer program is run in a processor or control module of either the terminal or UE), the network node, or some combination thereof.

The scope of the invention is also intended to include a device, including chip hardware, comprising one or more integrated circuits for detecting in a terminal that a downlink shared channel cannot be received reliably from a serving cell in a network when a control channel is mapped to the shared channel and autonomously moving the terminal to another protocol state. The device may take the form of an application specific integrated circuit (ASIC) for performing the functionality thereof. For example, the chip hardware may form part of the terminal or the network node that forms part of the serving cell.

In its most basic operation, the present invention defines a whole new terminal or UE behavior in a case, for example, where the terminal or UE detects that it cannot receive, for example, the HS-DSCH from a serving cell reliably when the DCCH is mapped to HS-DSCH (e.g. does not receive any radio link control (RLC) acknowledged mode feedback for the uplink measurement reports or in general the common pilot channel (CPICH) level drops too low in the serving HS-DSCH cell).

In one solution, the terminal would be autonomously moved to the cell forward access channel (CELL_FACH) state and would initiate uplink signaling on the random access channel (RACH) to inform the network and ask for HS-DSCH re-establishment in a suitable cell (preferably in the one being strongest one in the active set or according to the measurements done prior the connection from the serving HS-DSCH cell was lost), or the regular R'99/R'5 DPCH would be set up in order to restore the RRC signaling connection in the CELL_DCH state.

As an alternative solution, instead of moving automatically to the CELL_FACH state and releasing the DPCH connection, the UE could maintain the physical layer connection of the DPCHs with the network and start listening to FACH (or HS-DSCH) of an another cell in the active set for RRC signaling. The drawback of this idea is that in a soft handover (SHO) there are several cells to choose from and the network would not automatically know to which cell the RRC message should be sent as FACH (as well as HS-DSCH) is sent to one cell only.

As a third solution, instead of moving automatically to the CELL_FACH state and releasing the DPCH connection, the UE could maintain the physical layer connection of the DPCHs with the network, and the UE and the network could automatically reconfigure the SRB to DPDCH, and in the case of Fractional DPCH being in use also reconfigure the Fractional DPCH to preconfigured R'99 DPCH. However this solution is likely to require more extensive preconfigurations for the UE than the other solutions and thus is not likely to be adopted.

One advantage of the present invention is that it provides a recovery mechanism in the case that a signaling radio bearer is mapped to the HS-DSCH and the HS-DSCH connection is lost.

The foregoing and other objects, features and advantages of the present invention will become more apparent in light of the following detailed description of exemplary embodiments thereof.

BRIEF DESCRIPTION OF THE DRAWING

The drawing is not drawn to scale and includes the following Figures:

FIGS. 1a and 1b show basic block diagrams of the UMTS packet network architecture, which is known in the art; and FIGS. 1c and 1d show diagrams respectively of channels carrying network control signaling and physical layer connection when the UE is in a soft handover.

FIG. 2 shows proposed fractional DPCH slot formats in the downlink. (3GPP adopted option 4)

FIG. 3 shows a block diagram of user equipment or a terminal according to the present invention.

FIG. 4 shows a block diagram of a network node according to the present invention.

BEST MODE FOR CARRYING OUT THE INVENTION

The implementation of the present invention may include the following:

An initial condition is that a signaling radio bearer (e.g. RRC signaling that is sent on a logical channel named DCCH) is mapped to the HS-DSCH. This has to be the case if the fractional DPCH is used as no other option exist.

Now, in the event that the HS-DSCH connection is lost (i.e. the network loses control over the UE or terminal), the UE could detect this situation and e.g. after some network set delay the UE could autonomously fall back to CELL_FACH mode and initiate the signal radio bearer (SRB) setup procedure over RACH as usual.

Additionally, the network could detect the same situation and after the abovementioned delay could internally consider the UE being in CELL_FACH state and subsequently terminate the hanging DPCHs.

The network could have control over the criteria when the UE considers that the HS-DSCH connection is lost, e.g. based on the CPICH level, delay since the last message was received (similar to already existing inactivity timer in the network side) or something else. Additionally, the network may set a hysteresis delay so that the UE would wait after detecting this situation before moving to CELL_FACH state.

FIG. 3: Terminal or UE 100

FIG. 3 shows, by way of example, a terminal or UE generally indicated as 100 according to the present invention that may form part of the network shown in FIGS. 1a and 1b, consistent with that shown and described herein. The terminal or UE includes a downlink shared channel detection module 102 and other terminal modules 104.

In operation, the downlink shared channel detection module 102 detects in the terminal that a downlink shared channel cannot be received reliably from a serving cell in a network when a control channel is mapped to the shared channel and autonomously moves the terminal to another protocol state.

The module 102 also cooperates with the network node shown and described in relation to FIG. 4 to provide an automatic re-establishment of a signaling carrying connection between the terminal and the network without actions needed from the user of the terminal.

Consistent with that described herein, the downlink shared channel may include a high speed downlink shared channel (HS-DSCH), the control channel may include a dedicated control channel (DCCH), the other channel state may include a cell forward access channel (FACH) state, and the protocol state may include a radio resource control (RRC) protocol state.

In operation, after the module 102 detects that the downlink shared channel is lost, it notifies the network node (FIG. 4) of the same. The module 102 also initiates uplink signaling on an access channel to inform the network node (FIG. 4) and ask for downlink shared channel re-establishment in a suitable cell. The access channel may include a random access channel (RACH). The suitable cell may be the strongest cell in an active set of cells, and may be based on measurements done prior to when the connection from the serving cell was lost. The scope of the invention is also intended to include the network initiating procedures for re-establishing the radio link and, if applicable, re-establishing the downlink shared channel connection, for example, in the network node consistent with that discussed herein.

The module 102 may also set up a regular R'99/R'5 DPCH in order to restore the radio resource control (RRC) signaling connection in a CELL_DCH mode.

By way of example, the functionality of the module 102 may be implemented using hardware, software, firmware, or a combination thereof, although the scope of the invention is not intended to be limited to any particular embodiment thereof. In a typical software implementation, the module 102 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Moreover, the scope of the invention is intended to include the module 102 being a stand alone module in the combination with other circuitry for implementing another module.

The other modules 104 and the functionality thereof are known in the art, do not form part of the underlying invention per se, and are not described in detail herein. For example, the other modules 104 may include other modules such as a UMTS subscriber identity module (USIM) and mobile equipment (ME) module, which are known in the art and not described herein. The module 102 may be a stand-alone module, form part of the USIM, ME or some combination thereof.

FIG. 4: Network Node 200

FIG. 4 shows, by way of example, a network node generally indicated as 200 according to the present invention that may form part of the RNS, RNC, node Bs or some combination thereof shown in FIGS. 1a and 1b, consistent with that shown and described herein. The scope of the invention is not intended to be limited to where the functionality of the network node is implemented in the network. The network node 200 includes a downlink shared channel module 202 and other network modules 204.

The downlink shared channel module 202 cooperates with the module 102 of the user equipment or terminal 100 in such a network as that shown in FIGS. 1a and 1b, wherein the module 202 allows the terminal 100 to detect that such a downlink shared channel cannot be received reliably from such a serving cell in the network when such a control channel is mapped to the shared channel and to move autonomously to such another protocol state, in accordance with the present invention and consistent with that described herein.

The module 202 also cooperates with the module 102 shown and described in relation to FIG. 3 to provide an automatic re-establishment of a signaling carrying connection between the terminal and the network without actions needed from the user of the terminal.

In operation, the module 202 may also initiate procedures for re-establishing the radio link and, if applicable, re-establishing the downlink shared channel connection, consistent with that discussed herein.

By way of example, the functionality of the module 202 may be implemented using hardware, software, firmware, or a combination thereof, although the scope of the invention is not intended to be limited to any particular embodiment thereof. In a typical software implementation, the module 102 would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Moreover, the scope of the invention is intended to include the module 102 being a stand alone module in the combination with other circuitry for implementing another module.

The other modules 204 and the functionality thereof are known in the art, do not form part of the underlying invention per se, and are not described in detail herein. For example, the other modules 204 may include one or more other modules in the RNS, RNC, Node B or some combination thereof, which are known in the art and not described herein.

List of Abbreviations

CPICH Common Pilot Channel
DCCH Dedicated Control Channel
DL Downlink
DPCH Dedicated Physical Channel
DPCCH Dedicated Physical Control Channel
DPDCH Dedicated Physical Data Channel
FACH Forward Access Channel
F-DPCH Fractional DPCH
HS-DSCH High Speed Downlink Shared Channel
RACH Random Access Channel
RLC Radio Link Control
RRC Radio Resource Control
SHO SOFT HANDOVER
SRB Signaling Radio Bearer
TFCI Transport Format Combination Indicator
TPC Transmission Power Control
UE User Equipment
UL Uplink The Scope of the Invention It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A method comprising:
   detecting in one or more modules of a terminal that a downlink shared channel cannot be received reliably from a serving cell in a network when a control channel is mapped to the downlink shared channel; and
   autonomously moving with the one or more modules the terminal from one protocol state to another protocol state based at least partly on this detection;
   wherein the downlink shared channel is a high speed downlink shared channel;
   wherein the control channel is a dedicated control channel; and
   wherein the another protocol state is a radio resource control protocol state.

2. A method according to claim 1, wherein the method includes automatic re-establishment of a signaling carrying connection between the terminal and the network without actions needed from a user of the terminal.

3. A method according to claim 1, wherein the method includes the terminal initiating uplink signaling on an access channel to inform a network node and asking for downlink shared channel re-establishment in a suitable cell.

4. A method according to claim 1, wherein the method includes network initiating procedures for re-establishing a radio link and, if applicable, re-establishing a downlink shared connection.

5. A method according to claim 3, wherein the method includes choosing the suitable cell that is the strongest cell in an active set.

6. A method according to claim 3, wherein the method includes choosing the suitable cell based on measurements done prior to when a connection from the serving cell was lost.

7. A method according to claim 1, wherein the method includes setting up a regular dedicated physical channel in order to restore a radio resource control signaling connection in a cell dedicated channel mode.

8. A method according to claim 1, wherein the another protocol state is a cell forward access channel state.

9. A method according to claim 3, wherein the access channel is a random access channel.

10. User equipment comprising:
    one or more modules, each comprising at least one processor and a least one memory, configured to detect that a downlink shared channel cannot be received reliably from a serving cell in a network when a control channel is mapped to the downlink shared channel and autonomously move the user equipment from one protocol state to another protocol state based at least partly on this detection;
wherein the downlink shared channel is a high speed downlink shared channel;
wherein the control channel is a dedicated control channel; and
wherein the another protocol state is a radio resource control protocol state.

11. User equipment according to claim 10, wherein the one or more modules are configured to automatically re-establish a signaling carrying connection with the network without actions needed from a user of the user equipment.

12. User equipment according to claim 10, wherein the one or more modules are configured to initiate uplink signaling on an access channel to inform a network node and ask for downlink shared channel re-establishment in a suitable cell.

13. User equipment according to claim 10, wherein the one or more modules are configured to rely on a network node to initiate procedures for re-establishing a radio link and, if applicable, re-establish a downlink shared channel connection.

14. User equipment according to claim 12, wherein the suitable cell chosen is the strongest cell in an active set.

15. User equipment according to claim 12, wherein the suitable cell chosen is based on measurements done prior to when a connection from the serving cell was lost.

16. User equipment according to claim 10, wherein the one or more modules are configured to set up a regular dedicated physical channel in order to restore a radio resource control signaling connection in a cell dedicated channel mode.

17. User equipment according to claim 10, wherein the another protocol state is a cell forward access channel state.

18. User equipment according to claim 12, wherein the access channel is a random access channel.

19. A network node comprising:
one or more modules, each comprising at least one processor and at least one memory, configured to cooperate with a terminal in a network by allowing the terminal to detect that a downlink shared channel cannot be received reliably from a serving cell in the network when a control channel is mapped to the downlink shared channel and to move autonomously the terminal from one protocol state to another protocol state based at least partly on this detection;
wherein the downlink shared channel is a high speed downlink shared channel;
wherein the control channel is a dedicated control channel; and
wherein the another protocol state is a radio resource control protocol state.

20. A network node according to claim 19, wherein the one or more modules are configured to allow the terminal to automatically re-establish a signaling carrying connection with the network without actions needed from a user of the terminal.

21. A network node according to claim 19, wherein the one or more modules are configured to allow the terminal to initiate uplink signaling on an access channel to inform the network node and to ask for downlink shared channel re-establishment in a suitable cell.

22. A network node according to claim 19, wherein the one or more modules are configured to initiate procedures for re-establishing a radio link and, if applicable, re-establishing a downlink shared channel connection.

23. A network node according to claim 21, wherein the suitable cell chosen is the strongest cell in an active set.

24. A network node according to claim 21, wherein the suitable cell chosen is based on measurements done prior to when a connection from the serving cell was lost.

25. A network node according to claim 19, wherein the one or more modules are configured to set up a regular dedicated physical channel in order to restore a radio resource control signaling connection in a cell dedicated channel state.

26. A network node according to claim 19, wherein the another protocol state is a cell forward access channel state.

27. A network node according to claim 21, wherein the access channel is a random access channel.

28. A system comprising:
a network node; and
a terminal having one or more modules, each comprising at least one processor and a least one memory, configured to cooperate with the network node by detecting that a downlink shared channel cannot be received reliably from a serving cell in a network when a control channel is mapped to the downlink shared channel and moving autonomously the user equipment from one protocol state to another protocol state based at least partly on this detection;
wherein the downlink shared channel is a high speed downlink shared channel;
wherein the control channel is a dedicated control channel; and
wherein the another protocol state is a radio resource control protocol state.

29. A system according to claim 28, wherein the system includes automatic re-establishment of a signaling carrying connection between the terminal and the network without actions needed from a user of the terminal.

30. A system according to claim 28, wherein the one or more modules is configured to initiate uplink signaling on an access channel to inform the network node and ask for downlink shared channel re-establishment in a suitable cell.

31. A system according to claim 28, wherein the system includes network initiating procedures for re-establishing a radio link and, if applicable, re-establishing downlink shared channel connection.

32. A system according to claim 30, wherein the system includes the suitable cell being chosen that is the strongest cell in an active set.

33. A system according to claim 30, wherein the system includes the suitable cell being choosing based on measurements done prior to when a connection from the serving cell was lost.

34. A system according to claim 28, wherein the system includes a regular dedicated physical channel being set up in order to restore a radio resource control signaling connection in a cell dedicated channel mode.

35. A system according to claim 28, wherein the another protocol state is a cell forward access channel state.

36. A system according to claim 30, wherein the access channel is a random access channel.

37. A method according to claim 1, wherein the method further comprises implementing the method via a computer program running in a processor or controller in the terminal.

38. A non-transitory computer-readable storage medium stored with instructions, which when executed by a processor, cause to be performed:
detecting in one or more modules of a terminal that a downlink shared channel cannot be received reliably from a serving cell in a network when a control channel is mapped to the downlink shared channel and autonomously moving with the one or more modules the terminal from one protocol state to another protocol state based at least partly on this detection;
wherein the downlink shared channel is a high speed downlink shared channel;
wherein the control channel is a dedicated control channel; and
wherein the another protocol state is a radio resource control protocol state.

39. A non-transitory computer-readable storage medium according to claim 38, wherein the executed instructions further cause to be performed automatic re-establishment of a signaling carrying connection between the terminal and the network without actions needed from a user of the terminal.

40. A non-transitory computer-readable storage medium according to claim 38, wherein the executed instructions further cause to be performed providing terminal initiating uplink signaling on an access channel to inform a network node and asking for downlink shared channel re-establishment in a suitable cell.

41. A non-transitory computer-readable storage medium according to claim 38, wherein the executed instructions further cause to be performed responding to network initiating procedures for re-establishing a radio link and, if applicable, re-establishing a downlink shared channel connection.

42. A method comprising:
detecting in one or more modules of a terminal that a downlink shared channel cannot be received reliably from a serving cell in a network when a control channel is mapped to the downlink shared channel;
autonomously moving with the one or more modules the terminal from one protocol state to another protocol state based at least partly on this detection; and
initiating uplink signaling on an access channel to inform a network node and asking for downlink shared channel re-establishment in a suitable cell;
wherein the downlink shared channel is a high speed downlink shared channel;
wherein the control channel is a dedicated control channel; and
wherein the another protocol state is a radio resource control protocol state.

43. A method according to claim 42, wherein the method includes automatically re-establishing a signaling carrying connection between the terminal and the network without actions needed from a user of the terminal.

44. A method according to claim 42, wherein the method comprises the one or more modules of the terminal initiating the uplink signaling.

45. A method according to claim 42, wherein the network initiates procedures for re-establishing a radio link and, if applicable, re-establishing a downlink shared channel connection.

46. A method according to claim 1, wherein the method further comprises notifying the network after the terminal detects that the downlink shared channel is lost.

47. User equipment according to claim 10, wherein the one or more modules is configured to notify the network after detecting that the downlink shared channel is lost.

48. A network node according to claim 19, wherein the one or more modules is configured to receive notification from the terminal after the terminal detects that the downlink shared channel is lost.

49. A system according to claim 28, wherein the one or more modules is configured to notify the network after the terminal detects that the downlink shared channel is lost.

50. A method according to claim 42, wherein the method further comprises notifying the network after the terminal detects that the downlink shared channel is lost.

51. A method according to claim 46, wherein only downlink signaling is lost, and uplink signaling is not lost.

52. A method according to claim 1, wherein the method comprises maintaining with the one or more modules of the terminal a physical layer connection of the downlink shared channel with the network and listening to other channel states of another cell in an active set for signaling, instead of moving automatically to the another protocol state and releasing the physical layer connection.

53. User equipment according to claim 10, wherein the one or more modules are configured to maintain a physical layer connection of the downlink shared channel with the network and listen to other channel states of another cell in an active set for signaling, instead of moving automatically to the another protocol state and releasing the physical layer connection.

54. A network node according to claim 19, wherein the one or more modules are configured to cooperate with the terminal so as to maintain a physical layer connection of the downlink shared channel with the network with the one or more modules listening to other channel states of another cell in an active set for signaling, instead of moving automatically to the another protocol state and releasing the physical layer connection.

55. A system according to claim 28, wherein the one or more modules are configured to maintain a physical layer connection of the downlink shared channel with the network and listen to other channel states of another cell in an active set for signaling, instead of moving automatically to the another protocol state and releasing the physical layer connection.

56. A method according to claim 1, wherein the method comprises detecting with the one or more modules that the shared channel connection is lost, moving to a cell forward access channel state and initiating a signal radio bearer setup procedure over an access channel.

57. A method according to claim 1, wherein the network detects that the shared channel connection is lost, internally considers the terminal to be in a cell forward access channel state, and subsequently terminates any hanging dedicated physical channels.

58. A method according to claim 1, wherein the detecting includes estimating a quality criterion based on information in the control channel received from the serving cell.

59. A method according to claim 58, wherein the information in the control channel includes information in one or more transport power control fields.

60. A method according to claim 56, wherein the method comprises detecting that the shared channel connection is lost when the quality of the control channel over a predetermined period is worse than a predetermined threshold quality.

61. A method according to claim 60, wherein the predetermined threshold quality is evaluated over about 160 milliseconds.

62. A method according to claim 56, wherein, when the terminal is in a given state where a dedicated physical channel is allocated to the terminal in uplink and downlink directions, then after considering the quality of a link over one or several consecutive evaluation periods to be "out of sync" in relation to established physical channels, the terminal starts a timer; and upon considering the quality of the link over one or multiple successive periods to be "in sync" the terminal stops and resets the timer, or if the timer expires then determines that there is a radio link failure.

63. A method according to claim 62, wherein the established physical channels include physical channels.

64. A method according to claim 56, wherein a transition to the cell forward access channel state occurs when all dedicated channels have been released.

65. A method according to claim 62, wherein when a radio link failure occurs, the one or more modules of the terminal clears a dedicated physical channel configuration, and performs a cell update procedure.

66. User equipment according to claim 10, wherein the one or more modules are configured to detect that a shared channel connection is lost, move to a cell forward access channel state and initiate a signal radio bearer setup procedure over an access channel.

67. User equipment according to claim 10, wherein the network detects that the shared channel connection is lost, internally considers the user equipment to be in a cell forward access channel state, and subsequently terminates any hanging dedicated physical channels.

68. User equipment according to claim 10, wherein the one or more modules are configured to detect the reliability of the downlink shared channel by estimating a quality criterion based on information in the control channel received from the serving cell.

69. User equipment according to claim 68, wherein the information in the control channel includes information in one or more transport power control fields.

70. User equipment according to claim 66, wherein the one or more modules is configured to detect that a shared channel connection is lost when the quality of the control channel over a predetermined period is worse than a predetermined threshold quality.

71. User equipment according to claim 70, wherein the predetermined threshold quality is evaluated over about 160 milliseconds.

72. User equipment according to claim 66, wherein, when the user equipment is in a given state where a dedicated physical channel is allocated to the terminal in uplink and downlink directions, then after considering the quality of a link over one or several consecutive evaluation periods to be "out of sync" in relation to established physical channels, the one or more modules is configured to start a timer; and upon considering the quality of the link over one or multiple successive periods to be "in sync" the one or more modules is configured to stop and reset the timer, or if the timer expires then is configured to determine that there is a radio link failure.

73. User equipment according to claim 72, wherein the established physical channels include physical channels.

74. User equipment according to claim 66, wherein a transition to the cell forward access channel state occurs when all dedicated channels have been released.

75. User equipment according to claim 72, wherein when the radio link failure occurs, the one or more modules is configured to clear a dedicated physical channel configuration, and perform a cell update procedure.

76. A network node according to claim 19, wherein the one or more modules are configured to detect that the shared channel connection is lost, internally consider the terminal to be in a cell forward access channel state, and subsequently terminate any hanging dedicated physical channels.

77. A system according to claim 28, wherein the one or more modules are configured to detect that the shared channel connection is lost, move to a cell forward access channel state and initiate a signal radio bearer setup procedure over an access channel.

78. A system according to claim 28, wherein the one or more modules are configured to detect that the shared channel connection is lost, internally consider the terminal to be in a cell forward access channel state, and subsequently terminate any hanging dedicated physical channels.

79. A system according to claim 28, wherein the one or more modules are configured to detect the reliability of the downlink shared channel by estimating a quality criterion based on information in the control channel received from the serving cell.

80. A system according to claim 79, wherein the information in the control channel includes information in one or more transport power control fields.

81. A system according to claim 77, wherein the one or more modules are configured to detect that the shared channel connection is lost when the quality of the control channel over a predetermined period is worse than a predetermined threshold quality.

82. A system according to claim 81, wherein the predetermined threshold quality is evaluated over about 160 milliseconds.

83. A system according to claim 77, wherein, when the terminal is in a given state where a dedicated physical channel is allocated to the terminal in uplink and downlink directions, then after considering the quality of a link over one or several consecutive evaluation periods to be "out of sync" in relation to established physical channels, the terminal starts a timer; and upon considering the quality of the link over one or multiple successive periods to be "in sync" the terminal stops and resets the timer, or if the timer expires then determines that there is a radio link failure.

84. A system according to claim 83, wherein the established physical channels include physical channels.

85. A system according to claim 77, wherein a transition to the cell forward access channel state occurs when all dedicated channels have been released.

86. A system according to claim 83, wherein when the radio link failure occurs, the terminal clears a dedicated physical channel configuration, and performs a cell update procedure.

87. A device, including chip hardware, comprising one or more modules, including integrated circuits, configured to detect in a terminal that a downlink shared channel cannot be received reliably from a serving cell in a network when a control channel is mapped to the downlink shared channel and to move autonomously the terminal from one protocol state to another protocol state based at least partly on this detection, wherein each of the one or more modules comprises at least one processor and at least one memory;
wherein the downlink shared channel is a high speed downlink shared channel;
wherein the control channel is a dedicated control channel; and
wherein the another protocol state is a radio resource control protocol state.

88. A device according to claim 87, wherein the device is an application specific integrated circuit for performing the functionality thereof.

89. A method comprising:
detecting in one or more modules of a terminal that a downlink shared fractional dedicated physical channel cannot be received reliably from a serving cell in a network when a control channel is mapped to the downlink shared fractional dedicated physical channel, a quality criterion being estimated based on information contained in one or more transmit power control fields in the downlink shared fractional dedicated physical channel; and autonomously moving with the one or more modules the terminal from a cell dedicated channel state to a cell forward access channel state after considering one or several consecutive evaluation periods to be "out of sync" and considering a radio link as failed based at least partly on this detection;

wherein the downlink shared channel is a high speed downlink shared channel;

wherein the control channel is a dedicated control channel; and wherein the another protocol state is a radio resource control protocol state.

90. A method comprising: detecting in one or more modules of one node that a downlink shared channel having a control channel mapped therein cannot be received reliably between two nodes in a network; and autonomously moving with the one or more modules the one node from one protocol state to another protocol state based at least partly on this detection;

wherein the downlink shared channel is a high speed downlink shared channel;

wherein the control channel is a dedicated control channel; and wherein the another protocol state is a radio resource control protocol state.

91. A method according to claim 90, wherein the downlink shared channel is a high speed downlink shared channel.

92. A method according to claim 91, wherein the detection is based on a quality criterion being estimated using information contained in one or more transmit power control fields in a downlink shared fractional dedicated physical channel.

93. A method according to claim 90, wherein one node is a terminal and the other node is a serving cell.

94. A method according to claim 90, wherein the control channel includes one or more transmit power control fields.

95. A method according to claim 90, wherein the one protocol state is a cell dedicated channel state and the another state is a cell forward access state.

96. Apparatus comprising:

means for detecting in one or more modules of a terminal that a downlink shared channel cannot be received reliably from a serving cell in a network when a control channel is mapped to the downlink shared channel; and means for autonomously moving the terminal from one protocol state to another protocol state based at least partly on this detection;

wherein the downlink shared channel is a high speed downlink shared channel;

wherein the control channel is a dedicated control channel; and wherein the another protocol state is a radio resource control protocol state.

97. Apparatus according to claim 96, wherein the means for autonomously moving the terminal to the another protocol state includes automatic re-establishment of a signaling carrying connection between the terminal and the network without actions needed from a user of the terminal; and initiating in terminal uplink signaling on an access channel to inform a network node and asking for downlink shared channel re-establishment in a suitable cell.

* * * * *

UNITED STATES PATENT AND TRADEMARK OFFICE
CERTIFICATE OF CORRECTION

PATENT NO. : 8,155,060 B2
APPLICATION NO. : 11/157486
DATED : April 10, 2012
INVENTOR(S) : Karri Ranta-Aho and Antti Toskala It is certified that error appears in the above-identified patent and that said Letters Patent is hereby corrected as shown below:

1. In column 8 at line 64 (claim 10, line 3), "a" should be --at--.

2. In column 10 at line 46 (claim 33, line 2), "choosing" should be --chosen--.

Signed and Sealed this
Twenty-fourth Day of July, 2012

David J. Kappos
*Director of the United States Patent and Trademark Office*